United States Patent
Gautier et al.

[11] Patent Number: 5,367,941
[45] Date of Patent: Nov. 29, 1994

[54] PNEUMATIC BOOSTER WITH VALVE

[75] Inventors: Jean Pierre Gautier; Ulysse Verbo, both of Aulnay-Sous-Bois, France

[73] Assignee: AlliedSignal Europe Services Techniques, Drancy, France

[21] Appl. No.: 50,204

[22] PCT Filed: Nov. 4, 1992

[86] PCT. No.: PCT FR92/01020

§ 371 Date: May 4, 1993

§ 102(e) Date: May 4, 1993

[87] PCT Pub. No.: WO93/11012

PCT Pub. Date: Jun. 10, 1993

[30] Foreign Application Priority Data

Nov. 27, 1991 [FR] France .................. 91 14667

[51] Int. Cl.$^5$ .................................. B60T 13/57
[52] U.S. Cl. .................... 91/369.2; 91/376 R
[58] Field of Search ............ 91/369.1, 369.2, 372, 91/373, 376 R

[56] References Cited

U.S. PATENT DOCUMENTS

| | | | |
|---|---|---|---|
| 3,081,744 | 3/1963 | Brooks et al. | 91/373 |
| 4,598,548 | 7/1986 | Wagner | 91/369.2 X |
| 5,096,267 | 3/1992 | Volz | 91/369.1 X |

FOREIGN PATENT DOCUMENTS

| | | |
|---|---|---|
| 0004477 | 10/1979 | European Pat. Off. . |
| 0308310 | 3/1989 | European Pat. Off. . |
| 0448417 | 9/1991 | European Pat. Off. . |
| 3836609 | 5/1990 | Germany . |

*Primary Examiner*—Edward K. Look
*Assistant Examiner*—John Ryznic
*Attorney, Agent, or Firm*—Larry J. Palguta

[57] ABSTRACT

The invention relates to a pneumatic brake-booster comprising a casing (10) inside which is a piston formed by a hub (20) and by a skirt (14) and which, with the aid of an unrolling membrane (12), defines a front chamber (16) permanently connected to a partial vacuum source and a back chamber (18) connected selectively to the front chamber (16) when a first valve passage (56, 58) is opened or to the atmosphere when a second valve passage (76, 78) is opened, the first and second valve passages (56, 58; 76, 78) being formed by first valve means (58, 78) co-operating with second valve means (56, 76), and being actuated by a control rod (35) capable of bearing, through the intermediary of a plunger (32), against one of the faces of a reaction disk (42) securely attached to a push rod (44).

According to the invention, the first valve means (58, 78) are formed on the hub (20) of the piston.

6 Claims, 1 Drawing Sheet

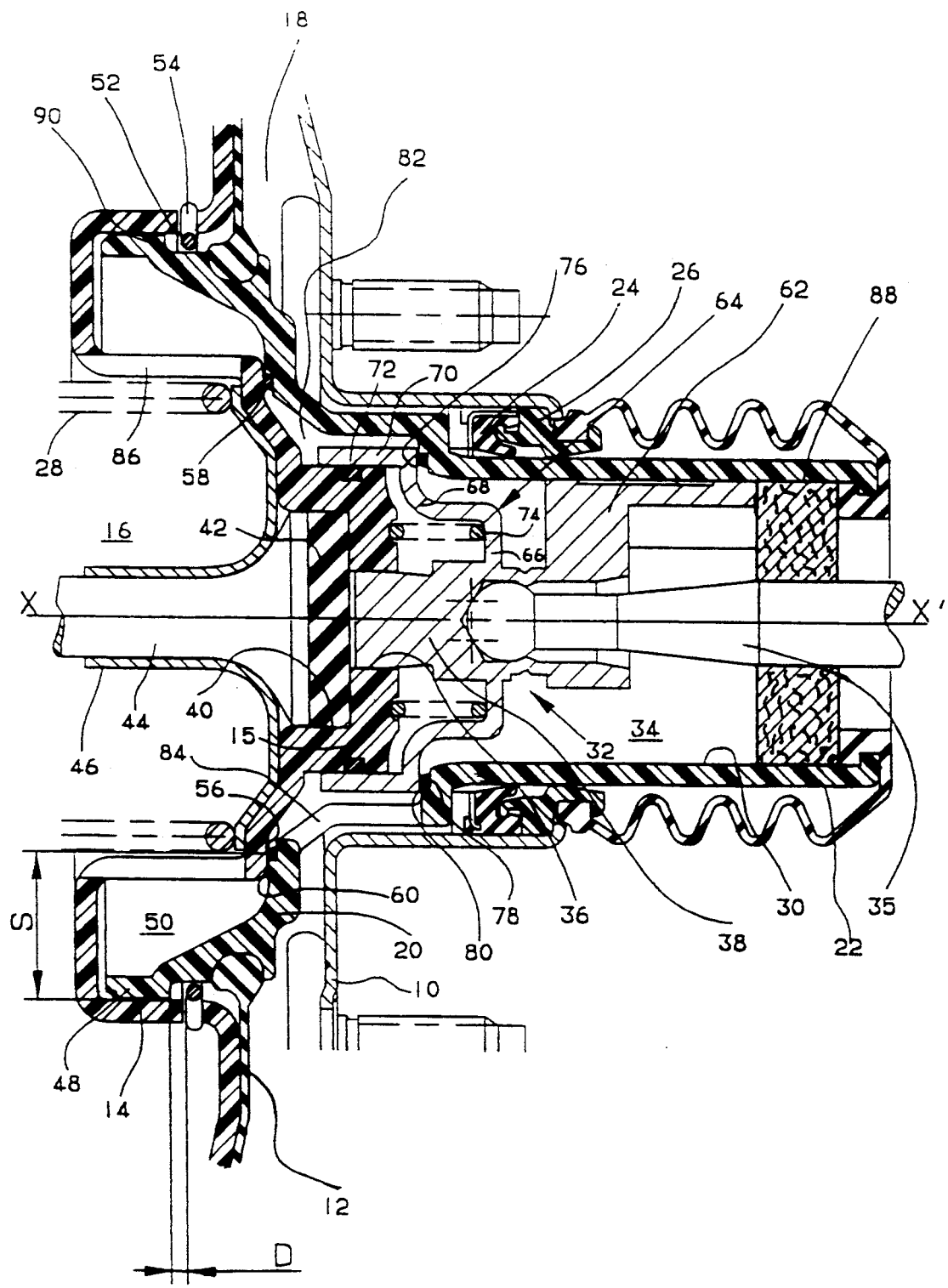

PNEUMATIC BOOSTER WITH VALVE

The present invention relates to pneumatic boosters, and more particularly those of the type used in order to boost the braking of motor vehicles.

Boosters of this type comprise in conventional manner a piston formed by a hub and by a skirt and which, with the aid of an unrolling membrane, defines a front chamber permanently connected to a partial vacuum source and a back chamber connected selectively to the front chamber when a first valve passage is opened or to the atmosphere when a second valve passage is opened, the first and second valve passages being formed by first valve means cooperating with second valve means, and being actuated by a control rod capable of bearing, through the intermediary of a plunger, against one of the faces of a reaction disc securely attached to a push rod.

Such boosters, as disclosed for example by Document EP-A-0,004,477, have some disadvantages. Thus, in order for the control rod not to have too long a dead travel, the valve means has necessarily to be designed in such a manner that the "shutter lift" between the valve shutter and the second valve seat is as low as possible. It therefore follows that, during braking, the chamber is reduced, as is the passage offered to the air from the back chamber towards the front cheer during brake release. The operation of these boosters is therefore accompanied by air suction noises, which may become annoying, all the more so as the structure of the piston hub, having a single radial passage towards the back chamber and a single axial passage towards the front chamber, additionally induces considerable turbulence in the moving air.

Another disadvantage due to these reduced and turbulent air passages resides in the fact that the air is greatly slowed down in its various movements between the atmosphere, the back chamber and the front chamber, and therefore that the boosters have long response times. Yet another disadvantage of known boosters resides in the fact that the annular shutter valve member has the general shape of a tulip with an external bead for its mounting, in association with the shutter valve member support, in the tubular hub of the piston assembly, the active part of the shutter valve member being connected to this mounting bead by a thin web which flares towards the outside so as to connect to the mounting bead. In such an arrangement, the intermediate web member of the shutter valve member is subjected, during the useful life of the booster, to very numerous flexural and compressive actions which in the long term can induce a fatigue, in this place, of the elastomer material constituting the shutter valve member. Moreover, in operation, this intermediate web part of the shutter valve member is subjected to a pressure differential between the atmosphere permanently prevailing inside the tubular hub, around the input rod, and the vacuum permanently prevailing in the annular chamber surrounding this intermediate web part of the shutter valve member and permanently connected to the front chamber, or partial vacuum chamber of the booster. This pressure differential, apart from contributing to the fatigue of the intermediate web part, induces on the active part of the shutter valve member an axial force which is added to the force of the valve spring and which the valve plunger must overcome during each brake release phase in order to disengage the active part of the shutter valve member from the first shutter valve seating formed in the hub and to re-establish the communication between the back working chamber of the booster and the partial vacuum chamber, which necessitates an overdimensioning of the input rod return spring, this manifesting itself particularly in the need for the driver to supply a substantial force in order to operate the booster, said force being known in the arts [sic] by the term "attack force".

Document DE-A-3,836,609 also discloses a pneumatic booster, corresponding to the preamble of the main claim, in which booster some of the abovementioned disadvantages are avoided: it does not contain an annular shutter valve in the general shape of a tulip, and the dead travel of the control rod is reduced. It nevertheless retains other disadvantages, such as reduced valve passages, which generate suction noises, a single radial passage towards the back chamber and a single axial passage towards the front chamber, which passages generate turbulence, and a large cross-section permanently subjected to a pressure differential, requiring the return spring of the control rod to be overengineered, and resulting in a large attack force.

The object of the present invention is consequently provide a booster whose operation is silent and whose response time is as short as possible, in which the valve means pose no problem of service life and in which the force of the control rod return spring is reduced, and this in a simple, reliable and economical manner. To this end, the subject of the invention is a booster in which the air passages between the atmosphere and the back chamber on the one hand, the back chamber and the front chamber on the other hand, have the widest possible cross-section without having obstacles capable of generating turbulence.

According to the invention, the plunger includes a cylindrical part, sliding in leaktight fashion around a cylindrical part of the skirt of the piston, the valve seat of the second valve passage being formed on the hub following a circle whose diameter is equal or very close to that of the cylindrical part of the skirt.

The invention will now be described by way of example with reference to the accompanying drawings in which:

the single FIGURE is a side view, in longitudinal half-section, showing the central part of a pneumatic brake-booster constructed in accordance with the present invention.

The FIGURE shows part of a brake-booster intended to be placed in the usual manner between the brake pedal of a vehicle and the master cylinder controlling the hydraulic braking system of that vehicle. By convention, the part of the booster turned towards the master cylinder is termed the front of the booster and the part turned towards the brake pedal, the back.

The booster in the FIGURE comprises a shell-shaped outer casing 10, having a symmetry of revolution about an axis X-X'. Only the back central part of this casing 10 is shown in the FIGURE.

A flexible unrolling membrane 12 of elastomer, reinforced by a metal support disk 14 also termed skirt, defines inside the space delimited by the casing 10 a front chamber 16 and a back chamber 18. The outer peripheral edge (not shown) of the membrane 12 is secured in leaktight manner onto the outer casing 10. The inner peripheral edge of this same membrane terminates with a bead received in leaktight manner in an annular groove formed on the outer peripheral surface of a piston hub 20 disposed along the axis X-X' of the booster. This hub 20 extends backwards in the form of a tubular part 22 which passes in leaktight manner through the back wall of the casing 10. The leaktightness of this passing-through is ensured by a reinforced annular seal 24 which is secured by a ring 26 in a tubular central part extending backwards towards the back wall of the casing 10.

A compression spring 28 interposed between the skirt 14 and the front wall (not shown) of the outer casing 10 normally retains the skirt 14 in a backward rest position shown in the FIGURE, in which the back chamber 18 has its minimal volume and the front chamber 16 its maximum volume.

In its tubular back part 22, the hub 20 has a bore 30 in which is slidably received a plunger 32 also having a symmetry of revolution about the axis X-X', apertures 34 regularly distributed around the axis X-X', being provided in the back part of the plunger 32 so as to allow free rod passage to the atmospheric air. The front end of a rod 35 for control of the booster, also disposed along the axis X-X', is mounted in the manner of a ball joint in the plunger 32. The back end (not shown) of this rod 35, which projects outside the tubular part 22 of the hub 20, is controlled directly by the brake pedal (not shown) of the vehicle.

The central part 15 of the skirt is cylindrical and is formed with a stepped bore. The part 36 of smaller diameter of this bore is located towards the back and receives the front end 38 of the plunger 32, and the part 40 of larger diameter of this bore is located towards the front and receives a reaction disk 42 in a deformable material such as an elastomer and the back end of a push rod 44 designed to actuate a master cylinder (not shown) attached to the front wall of the casing 10. A cup 46 may advantageously be disposed between the skirt 14 and the spring 28 so as to keep the push rod 44 in place in the absence of the master cylinder, for example during the assembly of the booster.

The hub 20 is formed with an annular front end 48 received in an annular groove 50 formed on the back face of the skirt 14. Preferably, the end 48 and one of the walls of the groove 50 have a complementary shape so as to ensure the mutual guiding of the skirt 14 and of the hub 20 when the end 48 slides in the groove 50 during the operation of the booster. A retaining ring 52 is disposed in an aperture 54 formed in the wall of the groove 50 formed in the skirt 14 and which co-operates with the end 48 so as to assemble the skirt 14 and the hub 20, while permitting a limited relative translational movement of these two parts.

With the booster in the rest position shown in the FIGURE, the skirt 14 is pushed backwards by the spring 28 and comes to bear against the hub 20, which itself comes to bear against the reinforced annular seal 24, which thus defines the backward rest position of the skirt 14 and of the hub 20. More precisely, the skirt 14 is shaped on its back face with a flat annular surface 56 perpendicular to the axis X-X' which comes to bear against a resilient bead 58 disposed on a flat annular surface 60 perpendicular to the axis X-X' of the hub 20 turned forwards. The bead 58 thus forms a valve seat co-operating with the surface 56 so as to form a first shutter valve.

The plunger 32 is formed with a back part 62 sliding in the bore 30 of the tubular part 22 of the hub 20 and the front part 38 sliding in the bore part 36 of the skirt 14. Between the back part 62 and front part 38 of the plunger 32 is integrally formed an extension 64 extending first radially outwards so as to form an annular part 66, and then, from the outer peripheral edge of the latter, axially forwards so as to form an intermediate part 68 in the general shape of a truncated cone, and then, from the front edge of the latter, axially forwards so as to form a cylindrical part 70 sliding in leaktight manner owing to a seal 72 on the cylindrical central part 15 of the skirt 14. Advantageously, apertures will be made in the intermediate part 68 so as to allow air at atmospheric pressure to enter the space situated between the plunger 32 and the skirt 14.

Between the back face of the cylindrical central part 15 of the skirt 14 and the front face of the annular part 66 of the plunger 32 is disposed a spring 74 pushing the plunger backwards into its rest position. In this position, it comes to bear against the hub 20. More precisely, the intermediate part 68 is shaped on its rear face with a flat annular surface 76 perpendicular to the axis X-X' which comes to bear against a resilient bead 78 disposed on a flat annular surface 80 perpendicular to the axis X-X' of the hub 20 turned forwards. The bead 78 thus forms a valve seat co-operating with the surface 80 so as to form a second shutter valve.

An annular volume 82 is therefore defined by the part of the hub 20 situated between the two beads 58 and 78, the part of the skirt 14 situated between the bead 58 and the cylindrical part 15 on which slides the cylindrical part 70 of the plunger 32.

Apertures 84 are made in the hub 20 in order to cause this annular volume 82 to communicate with the back chamber 18 of the booster, and apertures 86 are made in the skirt 14 so as to cause the groove 50 to communicate with the front chamber 16 of the booster.

The operation of the booster which has just been described will now be explained. When the booster is installed on a vehicle and is at rest, the front chamber 16 communicates permanently with a vacuum source, and is therefore under a partial vacuum, and so is the annular groove 50 owing to the apertures 86. The back chamber 18 is also under partial vacuum, which was established during a prior actuation of the booster as will be seen later. Moreover, the two shutter valves 56–58 and 76–78 are both closed.

In a first stage, the increase in the force on the brake pedal by the driver has the effect of equalling the prestress force of the spring 74. Then, the plunger 32 advances against the action of the spring 74, its front part 38 sliding in the bore 36 and its cylindrical part 70 sliding in leaktight manner around the cylindrical part 15 of the skirt 14. In this movement of the plunger, the surface 76 loses contact with the bead 78 and the corresponding shutter valve opens. Air at atmospheric pressure is therefore immediately admitted into the back chamber, after having passed through an air filter 88, via the valve passage 76–78, the annular volume 82 and the apertures 84 in the hub 20.

One very important advantage of the booster constructed according to the invention resides in the fact that this booster has the smallest possible dead travel since the entire operating phase of a conventional booster which was necessary for the isolation of the front and back chambers is eliminated.

The only dead travel of the booster of the invention is that which is due to the resilience of the bead 78 in order to ensure leaktightness of the valve passage 76–78, but is may be considered as negligible.

It can thus be seen that, owing to the invention, air is admitted into the back chamber 18 through the valve passage 76–78, which is of a diameter several times greater than in a conventional booster.

It follows that the passage cross-section presented to the moving air is multiplied by the same factor. A booster is therefore in fact obtained the operation of which is silent since such a widened passage cross-section enables the air to circulate without causing suction noises and other hisses. Moreover, the invention enables provision to be made for the apertures 34 and 84 to be equal in number and regularly distributed around the axis X-X', and so that their centers are in the same plane. In this manner, the masses of air set in motion during the operation of the booster of the invention will have a speed whose components will be contained only in this plane. In other words, the airflow in the booster is perfectly symmetrical around the axis X-X', that is to say that all turbulence is eliminated, and so are the noises resulting therefrom.

At the end of this first stage of actuation, air at atmospheric pressure is present in the back chamber 18, and a pressure differential is exerted over the entre surface S between the circumference of the cylindrical front end 48 of the hub 20 and the circumference corresponding to the contact of the bead 58 on the surface 56 of the skirt 14, the pressure differential being exerted on that surface S of the hub.

By judiciously selecting the area of that surface S, and also the value of the stiffness of the spring 74, the skirt 14—hub 20 assembly will move under the effect of this pressure differential creating a boost force.

Such a movement is transmitted to the push rod 44 by the reaction disk 42.

During this second phase of actuation of the brakes, the boost force exerted by the hub 20 does not deform the reaction disk 42 sufficiently in order for the latter totally to fill the space which initially separates it from the plunger 32.

Consequently, the output force applied to the master cylinder by the push rod 56 increases abruptly, whereas the force exerted on the control rod 35 remains unchanged.

This abrupt increase in the output force corresponds to what is termed the booster jump, that is to say the threshold beyond which the boost force generated in the booster and exerted on the reaction disk 42 by the hub 20 becomes sufficient for the front face of the plunger to come into contact with the reaction disk 42.

The movement of the assembly of the skirt 14 and of the hub 20 has also had the effect of bringing the bead 78 borne by the hub 20 onto the surface 76 of the skirt 14. Any subsequent increase in the force exerted by the driver on the input rod 35 will cause the valve passage 76–78 to reopen, so as to admit an additional quantity of air at atmospheric pressure into the back chamber 18, which has the effect of increasing the boost force exerted on the push rod 44 and increasing the reaction on the pedal exerted by the disk 42 on the plunger 32, then in contact with one another.

When the driver of the vehicle wishes to reduce or to put an end to his braking action, he reduces his force on the brake pedal. The input rod 35 then moves backwards and carries along in its movement the plunger 32, which comes into abutment via its surface 76 against the bead 78, and carries along with it the hub 20. This movement then causes the contact to be lost between the bead 58 borne by the hub 20 and the surface 56 of the skirt 14, thus opening the valve passage 56–68.

The air contained in the back chamber 18 is then sucked into the front chamber 16 via the valve passage 56–58, the groove 50 and the apertures 86. In order to permit a rapid rebalancing of pressure (in this case of partial vacuum) between the two chambers 16 and 18, the valve passage is allowed to open by a relatively large amount, that is to say that the hub 20 is movable in axial translation with respect to the skirt 14 and can move backwards by a predetermined distance D between the retaining ring 52 bears by the skirt 14 and a step 90 of the hub 20 turned towards the retaining ring 52.

It will therefore be seen that here again the air is induced to flow through the valve passage 56–68, of a diameter distinctly greater than conventional valve passages permitting with the aid of a large passage cross-section a likewise greater flow rate, which results in a reduced response time in the brake release phase.

The invention additionally provides for one very substantial advantage. In fact, the usual tulip-shaped shutter valve with its intermediate web part, a part continuously submitted to actions which fatigue it, is replaced through the present invention by two beads 58 and 78 forming a valve with the surfaces 56 of the skirt 14 and 76 of the plunger 32. The booster according to the present invention is therefore distinctly more reliable than conventional boosters.

Furthermore, at the beginning of the brake release phase, the force which the plunger 32 must overcome in order to open the valve passage 56–58 is that which is due to the pressure differential exerted on the surface S defined previously, less the force exerted by the spring 74. Then, in brake release phase, the only surface on which a pressure differential is exerted inducing an axial force which opposes the return of the skirt 14, is constituted by that of the cylindrical central part 15 of the skirt 14 the back face of which is always subject to atmospheric pressure, and the front face of which is always subject to the pressure prevailing in the front chamber 16.

Similarly, when the booster is at rest, the surface of the assembly on which a pressure differential is exerted, that is to say that on which the partial vacuum present in the booster is applied, is delimited by the bead 78. It can be seen then that, by disposing the bead 78 on the hub 20 so that it comes to be applied against the surface 76 following a circle of diameter equal to or very close to that of the cylindrical part 15 of the skirt 14, as shown in the FIGURE, the surface on which a pressure differential is exerted, and which is, as it were, "sucked", is constant, whether the booster is at rest or in brake release phase. This results in a very important feature of the booster according to the invention, namely that the force to be exerted on the plunger in order to actuate the booster is equal to that which is exerted on it in the brake release phase, or, in the terms used in the art, the attack force is equal to the return force.

It is this feature which enables the prestress of the spring 74 to be reduced very substantially, in fact, as was explained in the introduction, the presence of a tulip-shaped annular shutter valve in conventional boosters implies a "sucked" surface distinctly greater in the rest phase than that which exists in the brake release phase. That is why the prestress of the input rod return spring must be substantial, and that is why the attack force is considerably higher than the return force.

Owing to the invention, it is now possible to construct a booster in which the prestress of the spring 74 can be reduced, with the favorable consequences which follow from this for the attack force.

Yet another advantage of the quite special constitution of the booster of the invention will be noted. In fact, the spring 74 is seen to constitute the return spring of the control rod 35. Moreover, being disposed between the plunger 32 and the skirt 14, it performs the function of a shutter valve spring.

It may therefore be seen that the invention makes it possible to reduce the number of parts necessary for the operation of the booster. Consequently the booster will therefore only be easier to assemble, and so accordingly less costly and more reliable.

It can therefore be clearly seen that, according to the present invention, a pneumatic booster has been constructed in which the special arrangement of the valve seat enables it to operate silently, with very short response times, a reduced attack force and high reliability of the valve means. Of course, the invention is not limited to the embodiment which has been described by way of example, but is capable of receiving many variants which will be apparent to the person skilled in the art.

Thus, for example, the invention may be applied to boosters in tandem or having an additional chamber. Thus, also, the valve-forming beads may be formed on the plunger and on the skirt and co-operate with annular surfaces formed on the hub.

We claim:

1. Pneumatic brake-booster comprising a casing (10) inside which is a piston formed by a hub (20) and by a skirt (14) and which, with the aid of an unrolling membrane (12), defines a front chamber (16) permanently connected to a partial vacuum source and a back chamber (18) connected selectively to the front chamber (16) when a first valve passage (56, 58) is opened or to the atmosphere when a second valve passage (76, 78) is opened, the first and second valve passages (56, 58; 76, 78) being formed by valve seats (58, 78) co-operating with annular valve surfaces (56, 76), and being actuated by a control rod (35) capable of bearing, through the intermediary of a plunger (32), against one of the faces of a reaction disk (42) securely attached to a push rod (44), the skirt (14) of the piston being movable in axial translation with respect to the hub (20) over a predetermined distance (D), a spring (74) being disposed between the skirt (14) and the plunger (32) for returning the control rod (35) and acting as a shutter valve spring, characterized in that the plunger (32) includes a cylindrical part (70) sliding in leaktight manner around a cylindrical part (15) of the skirt (14) of the piston, the valve seat (78) of the second valve passage (76, 78) being formed on the hub (20) following a circle of diameter substantially equal to that of the cylindrical part (15) of the skirt (14).

2. Booster according to claim 1, characterized in that the hub (20) is formed with an annular front end (48) slidable received in an annular groove (50) formed on the back face of the skirt (14).

3. Booster according to claim 1, characterized in that the predetermined distance (D) is equal to the axial distance at rest between a retaining ring (52) disposed in an aperture (54) formed in the skirt (14) and a step (90) formed in the hub (20) facing the retaining ring (52).

4. Booster according to claims 2 and 3, characterized in that the aperture (54) is formed in one of the walls of the annular groove (50) and in that the step (90) is formed in the annular front end (48) of the hub (20).

5. Booster according to any one of the preceding claims, characterized in that at least one of the valve seats (58, 78) is formed by a bead (58, 78) formed on the hub (20) of the piston, and co-operating with an annular surface (56, 76) formed on the skirt (14) or the plunger (32).

6. Booster according to any one of claims 1 to 4, characterized in that at least one of the valve seats (56, 76) is formed by a bead (58, 78) formed on the skirt (14) or the plunger (32) and co-operating with an annular surface formed on the hub (20) of the piston.

* * * * *